UNITED STATES PATENT OFFICE.

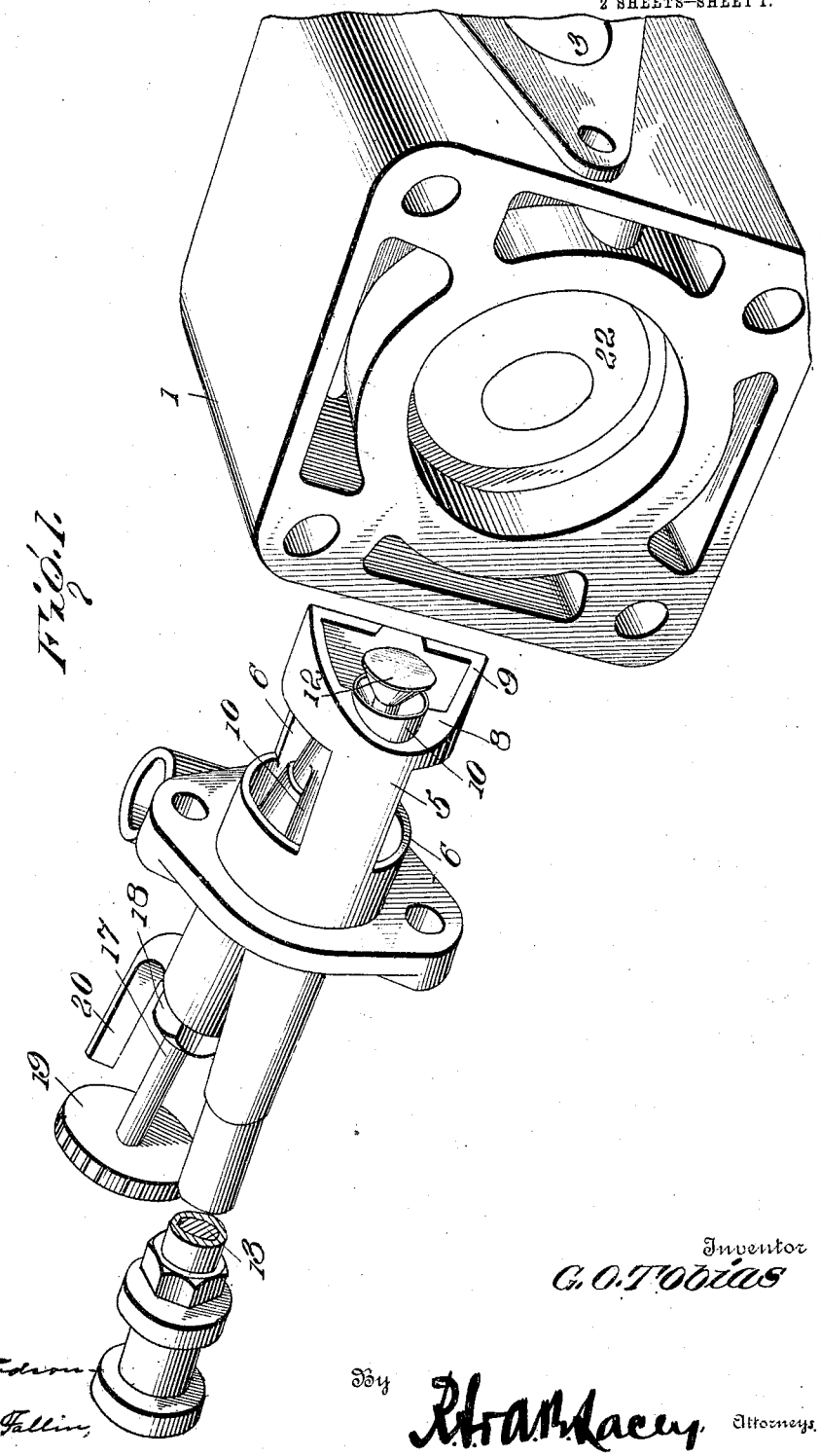

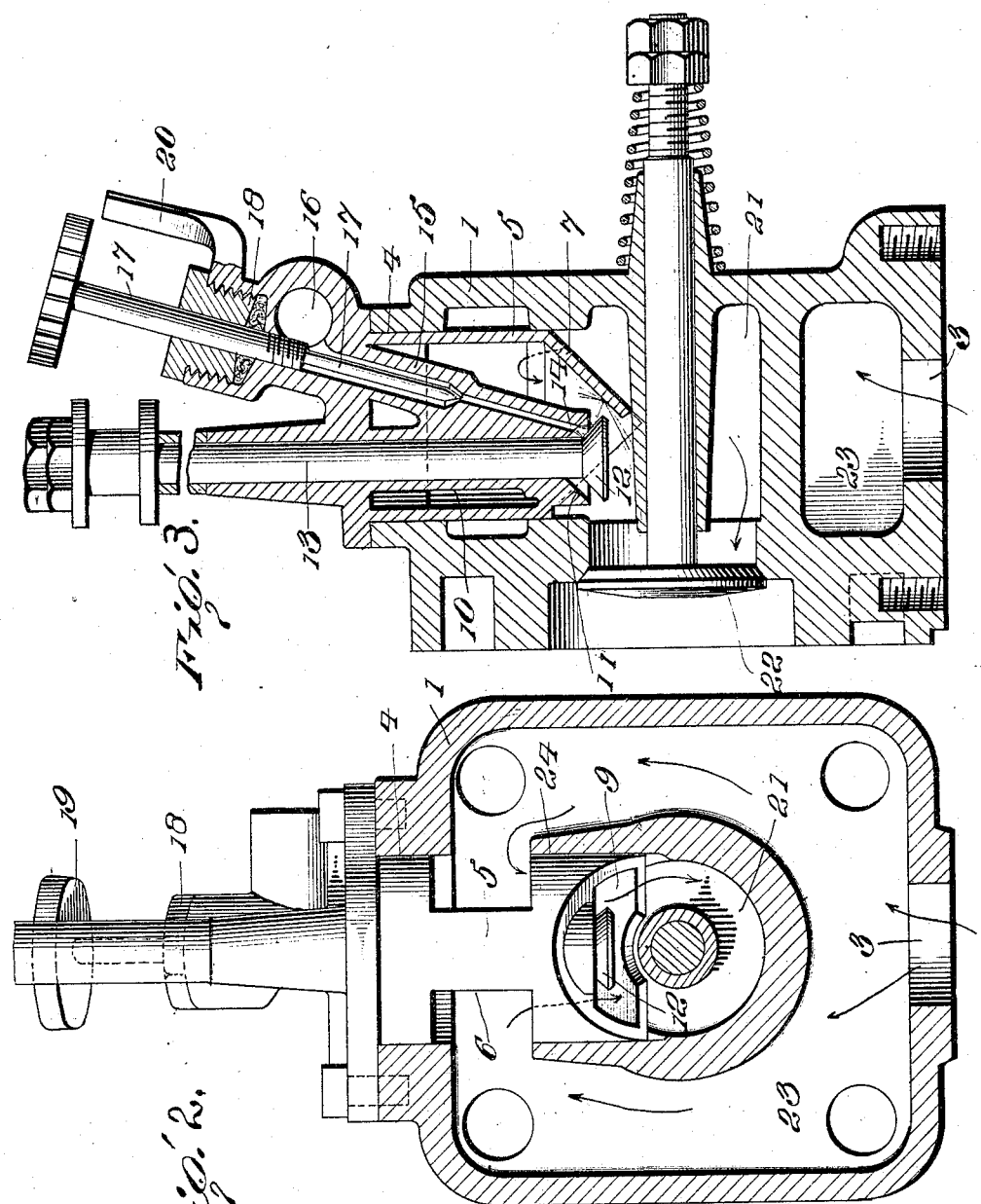

GUY O. TOBIAS, OF CLINTON, MISSOURI.

FUEL-VALVE FOR INTERNAL-COMBUSTION ENGINES.

981,819.  Specification of Letters Patent.  Patented Jan. 17, 1911.

Application filed April 22, 1910. Serial No. 557,037.

*To all whom it may concern:*

Be it known that I, GUY O. TOBIAS, citizen of the United States, residing at Clinton, in the county of Henry and State of Missouri, have invented certain new and useful Improvements in Fuel-Valves for Internal-Combustion Engines, of which the following is a specification.

This invention comprehends certain new and useful improvements in internal combustion engines, and relates particularly to an improved fuel valve for engines using gasolene or similar fuel.

The invention has for its primary object a simple, durable and efficient construction of fuel valve in which the gasolene for instance may be effectively controlled and which will insure that the liquid fuel will be admitted in the form of spray and be effectively vaporized and absorbed by the inrushing air so as to provide an efficient gaseous mixture.

The invention also has for its object an improved construction of fuel valve the parts of which may be easily mounted and readily assembled, and disassembled, should occasion require. And the invention has for a further object a simple fuel admission valve which moves freely through a relatively long bearing in the valve casing, with no packing on the stem of the valve, thereby avoiding any liability to corrode and insuring that the valve will always seat perfectly, allowing no fuel to be wasted during the idle strokes of the engine.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a perspective view illustrating the two main parts of my fuel valve in drawn out relation to each other; and, Figs. 2 and 3 are sectional views at right angles to each other, showing the parts assembled.

Corresponding and like parts are referred to in the following description and indicated in all the views of the drawings by the same reference characters.

Referring to the drawings, the numeral 1 designates a casing which is secured in any desired way, as by stud bolts to an engine cylinder, not shown, said casing being provided at one end with an air inlet port 3 and being provided at its opposite end with an opening 4 to receive the body portion 5 of the fuel valve. The body portion 5 is preferably a casting of bronze or the like, and is hollow and substantially cylindrical, as shown, being provided at opposite sides with preferably co-extensive segmental openings 6 establishing communication with the interior of the casing 1 and the interior of the body portion. The body portion 5 is also formed at one end with oppositely beveled and correspondingly angular walls 7 and 8 which meet at the median line of the body portion, one of said walls being preferably imperforate, while the other wall at its innermost end is formed with a transversely extending slot 9 establishing communication between the interior and exterior of the body portion at the end thereof. This end wall 8 is intersected by a tubular core 10 which is formed with a longitudinal opening extended therethrough and at the inner end of said opening with a preferably tapered recess surrounding the walls of the opening and constituting a valve seat, as indicated at 11. The valve 12 is correspondingly tapered to gradually fit on the valve seat 11 and the stem 13 of the valve moves freely through the longitudinal opening of the core 10 and out through an exterior extension of the core, being operatively connected in the ordinary manner to a cam on the side rod of the engine, whereby the valve is positively operated. Opening into the valve seat is a gasolene admission orifice 14 which opens from a passage 15 leading inwardly through the core 10 at an oblique angle to the longitudinal bore of the latter and leading from a preferably laterally disposed supply port 16 through which the gasolene passes from any desired source of supply. Mounted in the passage 15 is a needle valve 17 for throttling the gasolene, said needle valve passing outwardly through a gland 18 and being preferably provided at its outer end with a finger disk 19 displaying indicating numerals and provided with edge nicks or graduations designed to coact with a pointer arm 20 formed on the body portion 5, as clearly illustrated in the drawings.

As seen best in Fig. 3, the casing 1 is formed with two chambers, namely, an inner fuel inlet chamber 21 in which the intake valve 22 is mounted, and an outer air chamber 23 surrounding but distinct from the inner chamber 21. The wall which separates these two chambers is formed with an opening 24 establishing communication between them, this opening being preferably located in registry with and being preferably coextensive with the opening 4 before mentioned. In this opening 24 the inner end of the body portion 5 of the valve extends, while the openings 6 of the body portion 5 register with the space between the inner and outer walls of the casing.

From the foregoing description in connection with the accompanying drawing, the operation of my improved fuel valve will be apparent. In the practical use of the device, the gasolene issuing from the orifices 14 as the valve 12 is open, will be admitted into the inner chamber 21, and will be vaporized and absorbed by the inrushing air which enters the casing at the port 3 and passes in opposite directions around the wall of the inner chamber 21 and in through both of the side openings 6 and out of the body portion into the chamber 21, through the transverse slot 9, the gaseous mixture thus formed being directed laterally, that is, toward the intake valve 22 and thence passed to the engine cylinder.

Having thus described the invention, what is claimed as new is:

1. In a fuel valve mechanism for internal combustion engines, a casing formed with outer and inner chambers, with an air inlet opening leading to the outer chamber, with an opening leading into the outer chamber from a point opposite the air inlet opening, and with another opening establishing communication between the two chambers, the last named opening being in registry with the second-named opening, an intake valve in the inner chamber, a hollow valve body mounted in the second named opening and formed with side openings registering with the outer chamber, the inner end of said body extending into the opening which establishes communication between the two chambers, and having a slot which opens into the inner chamber, the valve body being further formed with a fuel discharge orifice in the inner chamber, and a valve controlling said orifice.

2. In a fuel valve mechanism for internal combustion engines, a casing formed with outer and inner chambers, with an air inlet opening leading to the outer chamber, with an opening leading into the outer chamber from a point opposite the air inlet opening, and with another opening establishing communication between the two chambers, the last named opening being in registry with the second-named opening, an intake valve in the inner chamber, a hollow valve body mounted in the second-named opening and formed with side openings registering with the outer chamber, the inner end of said body extending into the opening which establishes communication between the two chambers, and having a slot which opens into the inner chamber, the valve body being further formed with a fuel discharge orifice opening into the slot, and a valve adapted to open and close said orifice.

3. In fuel valve mechanism for internal combustion engines, the combination with a casing provided with a fuel inlet chamber of a hollow valve body formed with a longitudinally extending bore and a fuel inlet passage, the bore being formed at one end with a valve seat communicating with said chamber and the passage with an orifice communicating with said seat, a valve adapted to close on said seat to cut off the orifice and provided with a stem movable through the bore, and a needle valve mounted in the fuel passage, the body being formed with an oppositely beveled rear end, one wall of which is provided with a slot communicating directly with the valve seat and orifice, and the body being further formed with a side air inlet opening leading to the valve seat, substantially as described.

4. In fuel valve mechanism for internal combustion engines, the combination with a casing provided with a fuel inlet chamber, of a hollow valve body formed with a longitudinally extending bore, and a fuel inlet passage, the bore being formed at one end with a valve seat communicating with said chamber and the passage formed with an orifice communicating with said seat, a valve adapted to close on said seat to cut off the orifice and provided with a stem movable through the bore, and a needle valve mounted in the fuel passage, the body being formed with an oppositely beveled inner end, one wall of which is provided with a slot communicating directly with the valve seat and orifice, and the body being further formed with two oppositely disposed side openings adapted to admit air into the interior of the body portion.

5. In fuel valve mechanism for internal combustion engines, the combination with a casing provided with a fuel inlet chamber of a hollow valve body formed with a side air inlet opening and having an end slot the said body being secured to the casing and formed with a valve seat and fuel inlet orifices communicating with said slot and with the said chamber, a valve adapted to rest on said seat to close the orifice, and another valve controlling the passage of fuel to the orifice.

6. In fuel valve mechanism for internal combustion engines, the combination with a casing formed with a fuel inlet chamber, of a hollow valve body secured to said casing and formed with oppositely inclined walls at one end, one of said walls being formed with a transverse slot opening into said chamber, with a valve seat and a fuel inlet orifice communicating with said slot and with a longitudinally extending bore and an obliquely extending core, the former being formed with a bore leading to the valve seat, and the latter being provided with a fuel inlet passage leading to the orifice, a valve adapted to rest on said seat and provided with a stem mounted for a longitudinal movement in the bore, and a needle valve mounted in the passage.

In testimony whereof, I affix my signature in presence of two witnesses.

GUY O. TOBIAS. [L. S.]

Witnesses:
FRANK M. HART,
WILLIAM KIMBALL.